United States Patent
Schramm et al.

(10) Patent No.: US 11,149,812 B2
(45) Date of Patent: Oct. 19, 2021

(54) BRAKE DRUM AND METHOD FOR PRODUCING SUCH A BRAKE DRUM

(71) Applicant: KS HUAYU ALUTECH GMBH, Neckarsulm (DE)

(72) Inventors: Leander Schramm, Rudolstadt (DE); Christian Klimesch, Karlsruhe (DE); Herbert Moeding, Bad Friedrichshall (DE)

(73) Assignee: KS HUAYU ALUTECH GMBH, Neckarsulm (DE)

( * ) Notice: Subject to any disclaimer, the term of this patent is extended or adjusted under 35 U.S.C. 154(b) by 71 days.

(21) Appl. No.: 16/607,363

(22) PCT Filed: Apr. 17, 2018

(86) PCT No.: PCT/EP2018/059761
§ 371 (c)(1),
(2) Date: Oct. 23, 2019

(87) PCT Pub. No.: WO2018/197264
PCT Pub. Date: Nov. 1, 2018

(65) Prior Publication Data
US 2020/0132145 A1 Apr. 30, 2020

(30) Foreign Application Priority Data
Apr. 27, 2017 (DE) ...................... 10 2017 109 059.2

(51) Int. Cl.
*F16D 65/10* (2006.01)
*F16D 69/04* (2006.01)
*F16D 65/02* (2006.01)

(52) U.S. Cl.
CPC ............. *F16D 65/10* (2013.01); *F16D 69/04* (2013.01); *F16D 2065/132* (2013.01); *F16D 2065/1324* (2013.01); *F16D*
(Continued)

(58) Field of Classification Search
CPC .... F16D 65/10; F16D 69/04; F16D 2065/132; F16D 2250/0046; F16D 2200/0082;
(Continued)

(56) References Cited

U.S. PATENT DOCUMENTS

| 2,476,151 | A | * | 7/1949 | Le Juene ................ F16D 65/10 29/527.6 |
| 2,978,073 | A | | 4/1961 | Soddy |
| 5,079,825 | A | | 1/1992 | Matsui et al. |
| 6,443,211 | B1 | | 9/2002 | Myers et al. |

(Continued)

FOREIGN PATENT DOCUMENTS

| CN | 2736596 Y | 10/2005 |
| CN | 202971675 U | 6/2013 |
| CN | 104613109 A | 5/2015 |
| CN | 206017495 U | 3/2017 |

(Continued)

OTHER PUBLICATIONS

Translation of German Patent No. DE 102011054484 obtained from website: https://worldwide.espacenet.com on Mar. 8, 2021.*

*Primary Examiner* — Pamela Rodriguez
(74) *Attorney, Agent, or Firm* — Norman B. Thot

(57) ABSTRACT

A brake drum for a vehicle includes a friction ring and a drum body. The friction ring has grooves arranged on a radial outer surface along a circumference, and a coating formed on the grooves. The drum body is cast onto the radial outer surface of the friction ring so that the grooves are filled with a material of the drum body. The grooves include first grooves and second grooves. A first axial segment is formed at the friction ring in which the first grooves are introduced so that the first grooves are inclined relative to a first axial end of the friction ring. A second axial segment is formed at the friction ring in which the second grooves are introduced so that the second grooves are inclined in a direction which is opposite to that of the first axial segment. Each of the grooves have undercuts.

17 Claims, 1 Drawing Sheet

(52) U.S. Cl.
CPC ......... 2065/1344 (2013.01); *F16D 2069/0441* (2013.01); *F16D 2200/003* (2013.01); *F16D 2200/0013* (2013.01); *F16D 2200/0021* (2013.01); *F16D 2200/0082* (2013.01); *F16D 2250/0007* (2013.01); *F16D 2250/0046* (2013.01)

(58) Field of Classification Search
CPC ..... F16D 2065/1324; F16D 2065/1344; F16D 2069/0441; F16D 2200/0013; F16D 2250/0007; F16D 2200/003; F16D 2200/0021
See application file for complete search history.

(56) References Cited

U.S. PATENT DOCUMENTS

| | | |
|---|---|---|
| 2003/0159896 A1 | 8/2003 | Koizumi et al. |
| 2006/0027429 A1 | 2/2006 | Knight et al. |
| 2012/0189864 A1 | 7/2012 | Bucher |
| 2015/0362023 A1 | 12/2015 | Tohyama et al. |

FOREIGN PATENT DOCUMENTS

| | | |
|---|---|---|
| DE | 197 53 017 A1 | 6/1999 |
| DE | 10 2005 016 338 A1 | 10/2006 |
| DE | 197 23 036 B4 | 4/2007 |
| DE | 100 43 108 B4 | 1/2008 |
| DE | 10 2008 056 743 A1 | 5/2010 |
| DE | 10 2010 055 162 A1 | 6/2012 |
| DE | 10 2011 054 484 A1 | 4/2013 |
| EP | 1 292 781 B1 | 3/2007 |
| GB | 866880 A | 5/1961 |

\* cited by examiner

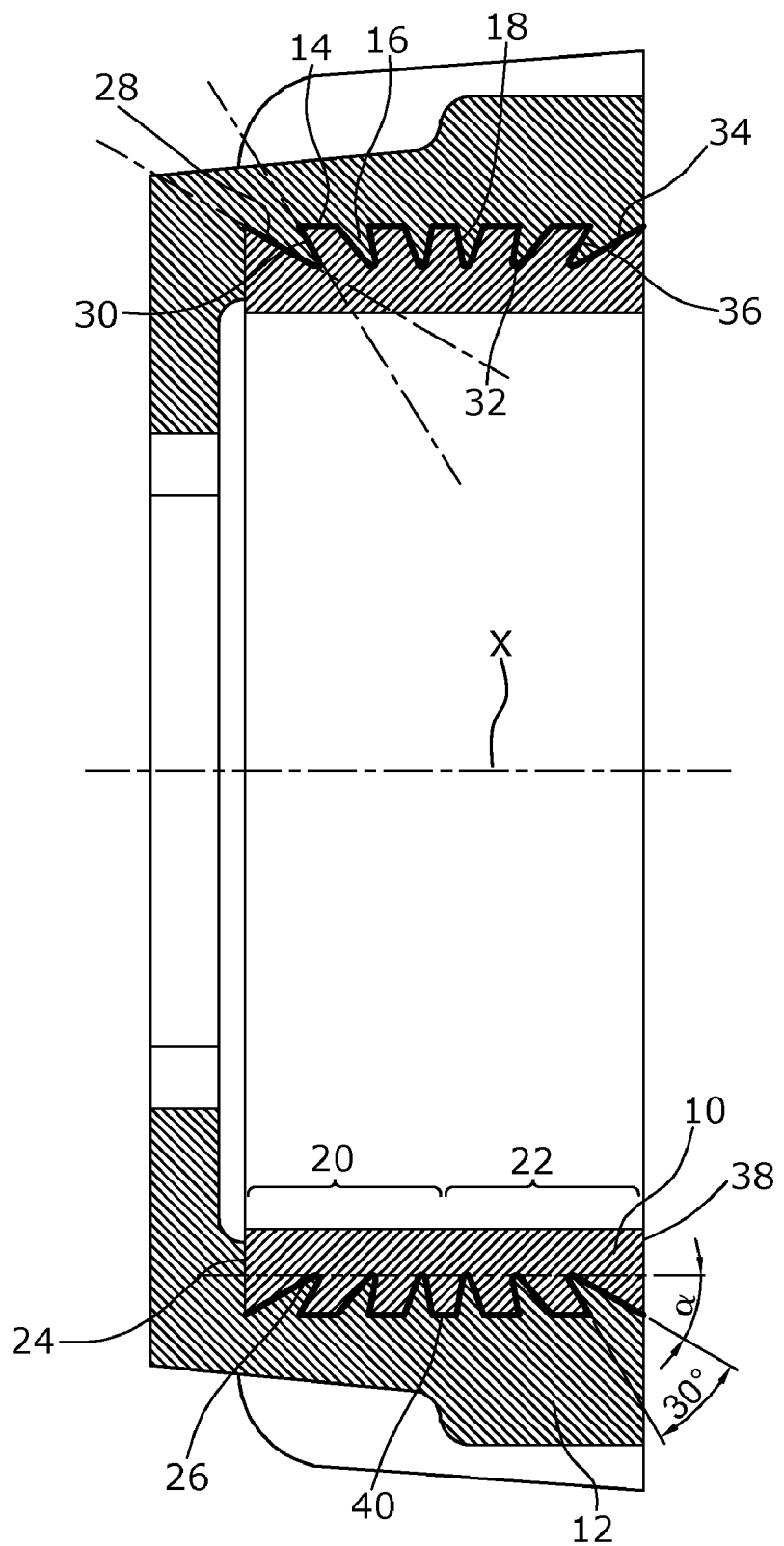

BRAKE DRUM AND METHOD FOR PRODUCING SUCH A BRAKE DRUM

CROSS REFERENCE TO PRIOR APPLICATIONS

This application is a U.S. National Phase application under 35 U.S.C. § 371 of International Application No. PCT/EP2018/059761, filed on Apr. 17, 2018 and which claims benefit to German Patent Application No. 10 2017 109 059.2, filed on Apr. 27, 2017. The International Application was published in German on Nov. 1, 2018 as WO 2018/197264 A1 under PCT Article 21(2).

FIELD

The present invention relates to a brake drum for a vehicle comprising a friction ring which has grooves on the radial outer surface of the friction ring along the circumference and a coating provided on the radial outer surface, and a drum body which is cast onto the radial outer surface of the friction ring so that the grooves are filled with the material of the drum body, and a method for producing the brake drum where a friction ring made from gray cast iron, steel, a metal-matrix compound material or a heavy-metal alloy is cast, the radial outer surface of the friction ring is subsequently mechanically machined for introducing grooves, whereupon the mechanically machined outer surface is coated with zinc or an alloy on a zinc basis, nickel or an alloy on an aluminum basis, and finally a drum body from an aluminum silicon alloy or an aluminum magnesium alloy is cast onto the radial outer surface of the friction ring.

Brake drums for both motor vehicles and for rail vehicles but also for two-wheeled vehicles are known and described in many applications. During the braking process, a respective brake shoe frictionally engages with a friction surface of the brake drum, which is usually provided on a radial inner surface. The prior-art brake drums are in most cases cast from gray cast iron or iron since high strength, dimensional stability, and heat conduction are required due to the strong forces which arise during the braking process.

For many years, there has at the same time been a growing demand to reduce fuel consumption and thus a necessity to save weight. For this reason, brake drums of a light metal have been proposed comprising a friction body which receives the forces produced and which is adequately wear-resistant and dimensionally stable.

DE 197 23 036 B4 accordingly describes a brake drum whose drum body is made from a light metal and which is positively connected to a friction ring, wherein the positive connection comprises undercuts. The two bodies are connected with each other by casting the friction ring integrally with the base body. Due to heating during operation or shrinking after casting, the two parts expand to a different degree, which may lead to relative movements of the two components relative to each other and thus disconnection from each other.

DE 10 2010 055 162 A1 therefore describes, for example, a cast-in component which is a friction ring for a brake drum. This friction ring can first be roughened and subsequently provided with a galvanically applied coating of nickel before the drum body is cast to the friction ring. The coating considerably improves the metallic adhesion of the drum body to the friction ring. Disconnection due to the exerted forces cannot, however, be reliably prevented.

SUMMARY

An aspect of the present invention is to provide a brake drum and a method for producing the brake drum where a long service life of the light-weight brake drum can be provided by reliably preventing the friction body from disconnecting from the drum body.

In an embodiment, the present invention provides a brake drum for a vehicle which includes a friction ring and a drum body. The friction ring comprises grooves arranged on a radial outer surface along a circumference, and a coating formed on the grooves on the radial outer surface. The drum body is cast onto the radial outer surface of the friction ring so that the grooves are filled with a material of the drum body. The grooves comprise first grooves and second grooves. A first axial segment is formed at the friction ring in which the first grooves are introduced so that the first grooves are inclined relative to a first axial end of the friction ring. A second axial segment is formed at the friction ring in which the second grooves are introduced so that the second grooves are inclined in a direction which is opposite to that of the first axial segment. The grooves each comprise undercuts as seen in a radial direction.

BRIEF DESCRIPTION OF THE DRAWING

The present invention is described in greater detail below on the basis of embodiments and of the drawing in which:

The FIGURE schematically shows a sectional side view of a brake drum.

DETAILED DESCRIPTION

Since a first axial segment is formed at the brake ring where the grooves are configured so that the grooves are inclined relative to the closest axial end of the friction ring, and a second segment is formed in which the grooves are configured so that the grooves are inclined in the direction opposite to that of the first segment, wherein the grooves comprise undercuts as seen in the radial direction, it is realized that despite the different degrees of shrinking due to the different expansion coefficients of the materials used, a fixed connection between the drum body and the friction ring, after having been cast onto each other, is maintained since the occurring shrink-fitting forces acting in the opposite direction on the friction ring at its axial ends can be taken up in both effective directions due to the inclined grooves. A mechanical clamping is also produced by the undercuts. This advantage also applies to the respective method where the grooves are introduced in a first segment and in a second segment so that they are inclined in opposite directions in the radial outer surface of the friction ring, and undercuts are produced, as seen in the radial direction, before the friction ring is molded in. Shrink-fitting stresses occur which considerably increase the strength of the connection. The existing coating improves the metallurgical bonding of the friction ring to the drum body. The undercuts generate a bonding force in the radial direction, whereby the bond strength is additionally increased.

In an embodiment, the inclination angle of the grooves relative to the center axis of the friction ring can, for example, be reduced in the first segment with a decreasing distance to the closest first axial end, and the inclination angle of the grooves in the second segment can, for example, be reduced with a decreasing distance to the opposite second axial end. It has turned out that radially acting contraction forces only essentially occur approximately in the middle of the friction ring, while an axial fraction of these contraction forces increases towards the axial ends of the friction ring. Due to the flanks of the grooves becoming increasingly steeper, their extension direction essentially corresponds to the direction of the resultant shrink-fitting force at each position, whereby these shrink-fitting forces are optimally taken up by the structure so that the bond strength is considerably increased.

In an embodiment, the friction ring can, for example, comprise a third segment in which no grooves are produced and which extends from the second segment to the opposite second axial end. In such an embodiment, the machining area can, for example, be limited to the area where forces are exerted during operation, whereby the machining costs are reduced.

It is advantageous when the grooves extend in the circumferential direction and have a depth of 0.03 to 2 mm. This depth suffices to provide a reliable bond without entailing excessive machining costs. A reliable filling of the grooves is also maintained at this groove depth even when undercuts are used.

A particularly simple machining is realized when the grooves in the two segments extend in opposite directions in a thread-type manner in the circumferential direction.

The grooves in the first segment can alternatively be arranged in the opposite direction to the grooves in the second segment and adjacent grooves can be arranged at a constant distance to each other so that they are disposed one behind the other.

Good results are achieved when the grooves have an opening angle of 20° to 40° between the two defining flanks. In this area, both a complete filling of the grooves and a good machinability are achieved.

The grooves advantageously have an inclination angle between the center axis and the leading flank of the groove of 20° to 60°, which essentially corresponds to the direction of the force action of the shrink-fitting forces. These inclination angles are suitable for filling the grooves even in the case of casting-on at a lower casting pressure, as in the case of gravity casting or low-pressure casting.

In the case of these casting processes, it is particularly advantageous when the inclination angle of the leading flank of each groove corresponds to the inclination angle of the trailing flank since, due to this diamond shape, filling of these grooves is considerably facilitated and thus leads to good bonding results during the casting-on processes at a lower pressure.

In an embodiment, the friction ring can, for example, be made from gray cast iron, steel, a metal-matrix-compound material, or a heavy-metal alloy, and the drum body can, for example, be made from an aluminum silicon or an aluminum magnesium alloy. The friction ring offers sufficient resistance to thermal stress and little abrasion during the braking operation, while the light-metal alloys offer a low weight and a good castability.

The alloy of the drum body should advantageously comprise a nickel fraction and a copper fraction of smaller than 0.05% by weight, whereby the corrosion behavior of the material is considerably improved.

In an embodiment of the present invention, the coating can, for example, have a layer thickness from 0.01 mm to 0.8 mm and is made from zinc, a zinc-based alloy, nickel or an aluminum-based alloy. Due to the use of such a coating, the metallurgical bond between the friction ring and the drum body is considerably improved and gap formation is reliably prevented even after the shrinking process so that during operation no internal corrosion processes can occur and a uniform force transmission and heat dissipation are realized.

The coating can, for example, be applied by thermal spraying, galvanic processes or by zinc coating. These coatings considerably improve the respective metallurgical bonding of the gray cast iron or steel friction ring to the aluminum alloy of the drum body.

The pressure casting method is particularly well suited for producing the drum body, which provides a filling of the undercut structures at the friction ring.

The radial outer surface of the friction ring first blasted or chemically treated to additionally provide that the coating enters into a good bonding with the friction ring when a thermally sprayed coating is used as a coating.

For improving its bonding to the friction ring, the radial outer surface of the latter is first etched or pickled and subsequently treated with electrolytes prior to galvanically applying the coating.

The bonding of a galvanically applied coating is also improved when a nickel layer is applied to the outer surface prior to the galvanic coating.

With the brake drum according to the present invention and the method for producing such a brake drum, a long service life is attained at a low weight and with a simple and inexpensive production, whereby the fuel consumption of vehicles is reduced. An optimized bonding of the drum body to the friction ring is established by improving the bond both mechanically by utilizing the shrink-fitting forces and metallurgically by using various coatings. Corrosion or gap formation is also reliably prevented, which increases the service life of such a brake drum.

A brake drum according to the present invention as well as the method for producing the brake drum are exemplified based on the drawing below which schematically shows a sectional side view of a brake drum.

The brake drum illustrated in the FIGURE comprises a friction ring 10 onto which a drum body 12 is cast. The friction ring 10 is first cast from gray cast iron, steel, a metal-matrix compound material or a heavy-metal alloy, and serves as a friction surface for braking a vehicle so that the friction ring 10 is subjected to an increased frictional and thermal stress.

For this reason, the friction ring 10 must have a high bonding strength to the cast-on drum body 12 which is made from an aluminum silicon or an aluminum magnesium alloy and is cast onto the friction ring 10 by a pressure casting process. The material of the drum body 12 has a high thermal conductivity for an improved heat dissipation from the brake drum as well as a low specific weight for saving fuel when the vehicle is in operation.

For realizing this improved bonding, the friction ring 10 is first mechanically machined on its radial outer surface 14. Via suitable cutting tools, grooves 16, 18 are cut into the radial outer surface 14, the grooves 16, 18 having a groove depth of approximately 0.03 to 2 mm. According to the present invention, the grooves 16, 18 are differently configured in two different segments 20, 22 of the friction ring 10. In the first axial segment 20, the grooves 16 are configured so that they are inclined relative to the closest first axial end 24 and comprise radial undercuts 26. This means that the groove flanks 28, 30 laterally defining the grooves 16 include an inclination angle α of smaller than 90° to a vector along a center axis X of the friction ring 10 pointing to the first axial end 24, or a tangent along the cast and unmachined radial outer surface of the friction ring 10. In the second axial segment 22, the grooves 18 are configured so that they are inclined in the opposite direction and also comprise radial undercuts 32. The groove flanks 34, 36 defining the grooves 18 have an inclination angle α of larger than 90° corresponding to a vector along a center axis X of the friction ring 10 pointing to the first axial end 24.

The grooves 16, 18 are each configured as thread grooves, but may also be configured as individual grooves extending in the radial direction. The exemplary embodiment shows a particularly advantageous configuration of these grooves 16, 18 because they have an inclination angle α changing over the height of the friction ring 10. Said angle decreases in the first segment 20 with a decreasing distance to the closest first axial end 24, while in the second axial segment 22, it increases with an increasing distance to the closest first axial end 24 or, in other words, also decreases in the second axial segment 22 relative to a vector pointing to the second opposite axial end 38 with a decreasing distance to this opposite second axial end 38. The dimensioning of the change of the inclination angle can, for example, be effected as a function of the thermal expansion coefficients of the two materials used so that the shrink-fitting forces occurring during cooling after the casting-on process and having both an axial component and a radial component possibly have the same angle relative to the center axis X as the grooves 16, 18 when defining their direction by the angle bisector between the respective tangents to the groove flanks 28, 30, 34, 36 of a groove 16, 18. Since the radial component of the shrink-fitting forces produced remains approximately the same over the height of the friction ring, while the axial shrink-fitting forces in the direction of the respective closest axial end 24, 38 increase, the vector of the resultant shrink-fitting force also includes a considerably smaller angle relative to the center axis X in the edge area at the axial ends than in the central area where the shrink-fitting force exclusively radially acts. For friction rings 10 with a normal size, it has turned out that the inclination angle α of the leading flank 28, 34 should decrease from approximately 60° to approximately 20° from the central area to the respective ends relative to the vector to the closest axial end 24, 38. The opening angle between the flanks 28, 30, 34, 36 is approximately 30°.

This configuration of the grooves 16, 18 produces a very high bond strength between the friction ring 10 and the drum body 12. For creating a good metallurgical bond besides this high mechanical clamping, the friction ring 10 is coated on its radial outer surface 14 prior to casting on the drum body. This coating 40 has a thickness of 0.01 to 8 mm and is either produced by thermal spraying or galvanic application of an aluminum-based alloy. The surface may alternatively also be coated with zinc, for example, by hot-dip galvanizing in a bath of a zinc or a zinc-based alloy. If the thermal spraying method is used, a surface activation by blasting or chemical processes can first be performed. In the case of the galvanic coating, a pretreatment by etching, pickling or deposition of a layer with an electrolyte, possibly with an additional nickel adhesion layer, is recommended.

After the application of this coating 40, the drum body 12 can now be cast onto the friction ring 10, in particular by a pressure casting process. This enables a very good filling of the grooves with the encapsulating material which should not contain any copper or nickel, if possible, for preventing corrosion.

When other cast-on processes are used, such as the low-pressure process or the gravity process, the rising of the leading and the trailing flanks 28, 30, 34, 36 should be approximately the same, and the profile depth should be adapted to provide that the grooves are if possible filled absent any air inclusions.

A brake drum produced in this manner comprises both an excellent mechanical and metallurgical bond between the drum body and the friction ring. Undesired corrosion processes are also prevented and a very good heat dissipation is provided. A brake drum produced via the method of the present invention also has a low weight while offering a long service life and a good braking power.

It should be appreciated that the scope of protection of the present invention is not limited to the described exemplary embodiment. The friction ring in particular need not have a groove profile over its overall height, but a third segment may exist where no grooves are formed. Design changes with regard to the individual components and the corresponding surfaces are of course conceivable. Individual grooves can also be produced beside the thread profiles. Reference should also be had to the appended claims.

What is claimed is:
1. A brake drum for a vehicle, the brake drum comprising:
   a friction ring comprising,
      grooves arranged on a radial outer surface along a circumference, and
      a coating formed on the grooves on the radial outer surface; and
   a drum body comprising a material, the drum body being cast onto the radial outer surface of the friction ring so that the grooves are filled with the material of the drum body,
   wherein,
   the grooves comprise first grooves and second grooves,
   a first axial segment is formed at the friction ring in which the first grooves are introduced so that the first grooves are inclined relative to a first axial end of the friction ring,
   a second axial segment is formed at the friction ring in which the second grooves are introduced so that the second grooves are inclined in a direction which is opposite to that of the first axial segment,
   the grooves each comprise undercuts as seen in a radial direction,
   an inclination angle of the first grooves relative to a center axis of the friction ring becomes smaller in the first axial segment with a decreasing distance to the first axial end, as seen in the direction of the first axial end, and
   an inclination angle of the second grooves in the second axial segment becomes smaller with a decreasing distance to a second axial end which is opposite to the first axial end, as seen in the direction of the second axial end.

2. The brake drum as recited in claim 1, wherein the friction ring further comprises a third segment in which no grooves are formed, and which extends from the second axial segment to the second axial end.

3. The brake drum as recited in claim 1, wherein the grooves extend in a circumferential direction and have a depth of 0.03 to 2 mm.

4. The brake drum as recited in claim 3, wherein the first grooves in the first axial segment extend in an opposite direction to the second grooves in the second axial segment in a thread-type manner in the circumferential direction.

5. The brake drum as recited in claim 1, wherein
   the first grooves in the first axial segment are arranged in an opposite direction to the second grooves in the second axial segment, and
   the second grooves which are adjacent to each other are arranged at a constant distance to each other so that they are disposed one behind the other.

6. The brake drum as recited in claim 1, wherein,
   each of the first grooves comprise defining flanks,
   each of the second grooves comprise defining flanks, and the first grooves and the second grooves each comprise an opening angle of 20° to 40° between their respective defining flanks.

7. The brake drum as recited in claim 6, wherein,
each of the defining flanks of the first grooves comprise a leading flank,
each of the defining flanks of the second grooves comprise a leading flank, and
an inclination angle between the center axis and each leading flank is 20° to 60°.

8. The brake drum as recited in claim 6, wherein,
each of the defining flanks of the first grooves further comprise a trailing flank,
each of the defining flanks of the second grooves further comprise a trailing flank, and
the inclination angle of the leading flank of each of the first grooves and the second grooves corresponds to an inclination angle of each of the trailing flanks.

9. The brake drum as recited in claim 1, wherein,
the friction ring is made from a gray cast iron, steel, a metal-matrix compound material or a heavy-metal alloy, and
the drum body is made from an aluminum silicon or an aluminum magnesium alloy.

10. The brake drum as recited in claim 9, wherein the aluminum magnesium alloy of the drum body comprises a nickel fraction and a copper fraction which is <0.05 wt. %.

11. The brake drum as recited in claim 1, wherein the coating has a layer thickness of from 0.01 mm to 0.8 mm and is made from zinc, a zinc-based alloy, nickel or an aluminum-based alloy.

12. A method for producing the brake drum as recited in claim 1, the method comprising:
casting the friction ring from a gray cast iron, steel, a metal-matrix compound material or a heavy-metal alloy;
mechanically machining the radial outer surface of the friction ring so as to introduce the grooves, the grooves being introduced into the radial outer surface in the first axial segment and in the second axial segment of the friction ring so that,
the grooves are inclined in opposite directions to each other and form the undercuts as seen in the radial direction,
coating the mechanically machined radial outer surface with zinc or a zinc-based alloy, nickel or an aluminum-based alloy; and
casting the drum body from an aluminum silicon alloy or an aluminum magnesium alloy onto the radial outer surface of the friction ring.

13. The method as recited in claim 12, wherein the coating is applied via a thermal spraying, via a galvanic process or via a zinc coating.

14. The method as recited in claim 13, wherein,
the coating is applied via the thermal spraying, and
prior to the thermal spraying, the method further comprises:
blasting the radial outer surface, or
chemically treating the radial outer surface.

15. The method as recited in claim 13, wherein,
the coating is applied via the galvanic process, and
prior to the galvanic process, the method further comprises:
etching or pickling the radial outer surface; and then
treating the radial outer surface with electrolytes.

16. The method as recited in claim 15, further comprising:
applying a nickel layer to the radial outer surface prior to the galvanic process.

17. The method as recited in claim 12, wherein the casting of the drum body is performed via a pressure casting process.

* * * * *